United States Patent [19]

Kasenga et al.

[11] Patent Number: 5,047,173
[45] Date of Patent: Sep. 10, 1991

[54] METHOD OF REDUCING THE POWDER WEIGHT OF EUROPIUM ACTIVATED STRONTIUM TETRABORATE PHOSPHOR

[75] Inventors: Anthony F. Kasenga; Joseph J. Lenox, both of Towanda; James J. Colson, Jr., Wyalusing, all of Pa.

[73] Assignee: GTE Products Corporation, Stamford, Conn.

[21] Appl. No.: 666,303

[22] Filed: Mar. 8, 1991

[51] Int. Cl.$^5$ ............................................. C09K 11/63
[52] U.S. Cl. ............................................. 252/301.4 R
[58] Field of Search ................................. 252/301.4 R

[56] References Cited

U.S. PATENT DOCUMENTS 4,719,033  1/1988  Chenot et al. ............... 252/301.4 R

OTHER PUBLICATIONS

Machida et al., "J. of Lumin.", 21 (1979), pp. 101–110.

Primary Examiner—Jack Cooper
Attorney, Agent, or Firm—J. Theodosopoulos

[57] ABSTRACT

The powder weight of high powder weight $SrB_4O_7$:Eu phosphor is reduced by milling the phosphor, blending it with $EuF_3$ and $H_3BO_3$, firing the blend and then milling the blend in water containing $Sr(OH)_2.8H_2O$.

1 Claim, No Drawings

METHOD OF REDUCING THE POWDER WEIGHT OF EUROPIUM ACTIVATED STRONTIUM TETRABORATE PHOSPHOR

BACKGROUND OF THE INVENTION

This invention concerns europium activated strontium tetraborate UV emitting phosphors. Such phosphors are disclosed in U.S. Pat. No. 4,719,033.

SUMMARY OF INVENTION

It occasionally happens that particular lots of europium activated strontium tetraborate phosphors have too high a powder weight. That is to say, when used in a fluorescent lamp, more phosphor is required than a predetermined standard amount to obtain a desired lumen output. For example, in a particular 48" lamp, the predetermined standard amount is 6.5 grams but a high powder weight lot may require, say, 7.5 grams. This invention discloses a process for such high powder weight phosphors to reduce their powder weight without loss of brightness.

The high powder weight phosphor is milled to reduce particle size. It is then blended with europium trifluoride and boric acid, and then fired at a high temperature in a slightly reducing atmosphere. The fired material is then milled in water containing hydrated strontium oxide. Subsequently, the material is washed and dried.

DESCRIPTION OF THE PREFERRED EMBODIMENT

A lot of high powder weight $SrB_4O_7$:Eu phosphor had a powder weight of 7.5 grams and a 100 hour lumen measurement compared to a control of 107.3%. The phosphor was ball milled, using $\frac{3}{8}$" alumina balls, in hot water for one hour, filtered and then dried. To 22.47 kilograms of this milled material were added 58 grams of $EuF_3$ and 68.64 grams of $H_3BO_3$. This is equivalent to a mole ratio of 0.003 moles $EuF_3$ and 0.012 moles $H_3BO_3$ per mole of $SrB_4O_7$:Eu. The materials were thoroughly blended and then fired at 1675° F. for seven hours in an atmosphere of 4% hydrogen - 96% nitrogen. The fired cake was broken up and ten kilograms thereof was ball milled for one hour in sixteen liters of water to which 400 grams of $Sr(OH)_2.8H_2O$ had been added. The milled slurry was sieved, washed, filtered, oven dried and then sieved. The powder weight of this processed phosphor was not 4.76 grams and its 100 hour lumen measurement was 116.2%.

We claim:

1. A method of reducing the powder weight of $SrB_4O_7$:Eu phosphor without loss of brightness comprising the steps of: milling said phosphor; blending the milled phosphor with $EuF_3$ and $H_3BO_3$ in a ratio of one mole $SrB_4O_7$:Eu to 0.003 moles $EuF_3$ to 0.012 moles $H_3BO_3$; firing the blend at 1675° F. in an atmosphere of about 4% hydrogen - 96% nitrogen; milling the fired blend in water containing $Sr(OH)_2.8H_2O$; and then washing and drying the phosphor.

* * * * *